United States Patent [19]

Ulmer et al.

[11] Patent Number: 4,830,241
[45] Date of Patent: May 16, 1989

[54] ARRANGEMENT OF A SPARE WHEEL IN A MOTOR VEHICLE

[75] Inventors: Rolf Ulmer, Schönaich; Alfred Müller, Rottenburg; William Hugger, Sindelfingen; Heinz Hablitzel, Breitenstein, all of Fed. Rep. of Germany

[73] Assignee: Daimler-Benz Aktiengesellschaft, Fed. Rep. of Germany

[21] Appl. No.: 626,398

[22] Filed: Jun. 29, 1984

[30] Foreign Application Priority Data

Jun. 30, 1983 [DE] Fed. Rep. of Germany ....... 3323559

[51] Int. Cl.⁴ ............................................. B62D 43/10
[52] U.S. Cl. .................................. 224/42.2; 296/37.2
[58] Field of Search ............... 224/42.2, 42.24, 42.12, 224/42.13; 296/37.2, 37.3; 292/257; 70/259, 26

[56] References Cited

U.S. PATENT DOCUMENTS

| | | | |
|---|---|---|---|
| 1,724,281 | 8/1929 | Hathorn | 224/42.14 X |
| 1,883,032 | 10/1932 | Smith | 224/42.24 X |
| 1,934,036 | 11/1933 | Canedy | 292/257 X |
| 1,955,710 | 4/1934 | Lyon | 224/42.2 |
| 2,264,000 | 11/1941 | McKechnie | 224/42.14 |
| 2,631,886 | 3/1953 | Keller | 224/42.24 X |
| 2,831,622 | 4/1958 | Bacca | 224/42.24 |
| 2,852,174 | 9/1958 | Mauerer | 224/42.14 |
| 3,361,465 | 1/1968 | Dobbs | 292/257 |
| 3,880,335 | 4/1975 | Winkler | 224/42.13 |
| 4,042,158 | 8/1977 | Cole | 224/42.24 X |
| 4,111,344 | 9/1978 | MacDonald | 224/42.24 |
| 4,153,188 | 5/1979 | Seymour | 224/42.24 |
| 4,227,737 | 10/1980 | Vogt | 224/42.13 X |
| 4,388,873 | 6/1983 | Carleton et al. | 292/257 X |
| 4,498,614 | 2/1985 | Guarr | 224/42.24 X |

FOREIGN PATENT DOCUMENTS

| | | | |
|---|---|---|---|
| 611892 | 7/1926 | France | 224/42.14 |
| 79630 | 10/1955 | Netherlands | 224/42.13 |
| 2081657 | 2/1982 | United Kingdom | 224/42.2 |

Primary Examiner—Henry J. Recla
Attorney, Agent, or Firm—Barnes & Thornburg

[57] ABSTRACT

A spare wheel suitable for storage in a trough in a motor vehicle includes a wheel rim which is formed to include a container-receiving cavity. A pot-shaped container is inserted therein. Fastening mechanisms are provided to secure both the spare wheel and the container in a position within the motor vehicle trough.

7 Claims, 2 Drawing Sheets

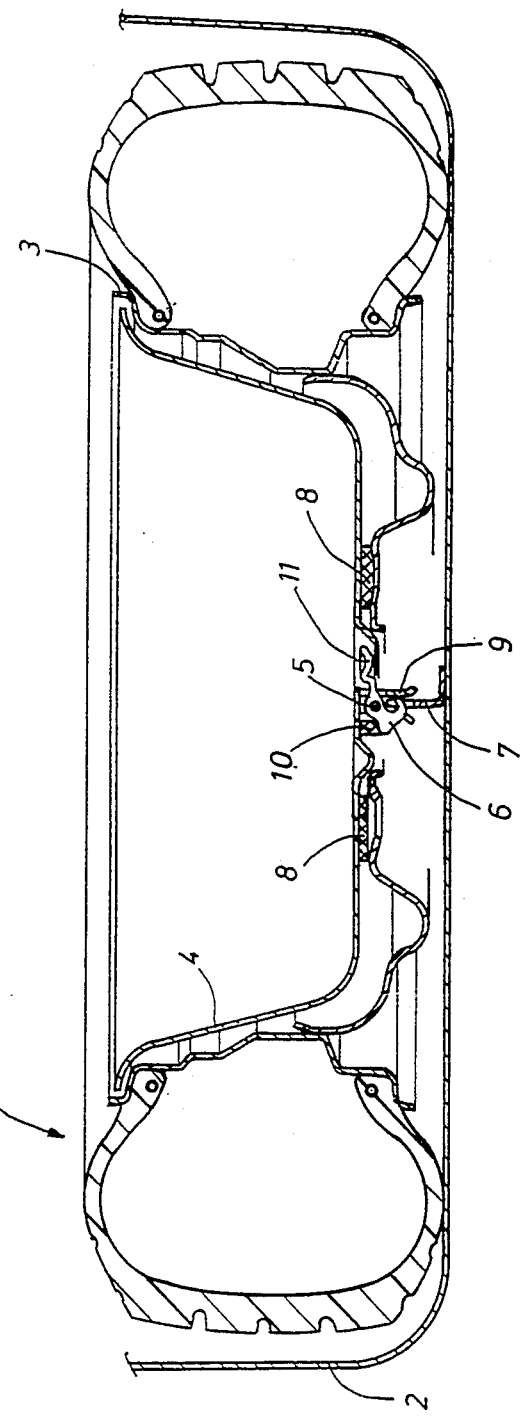

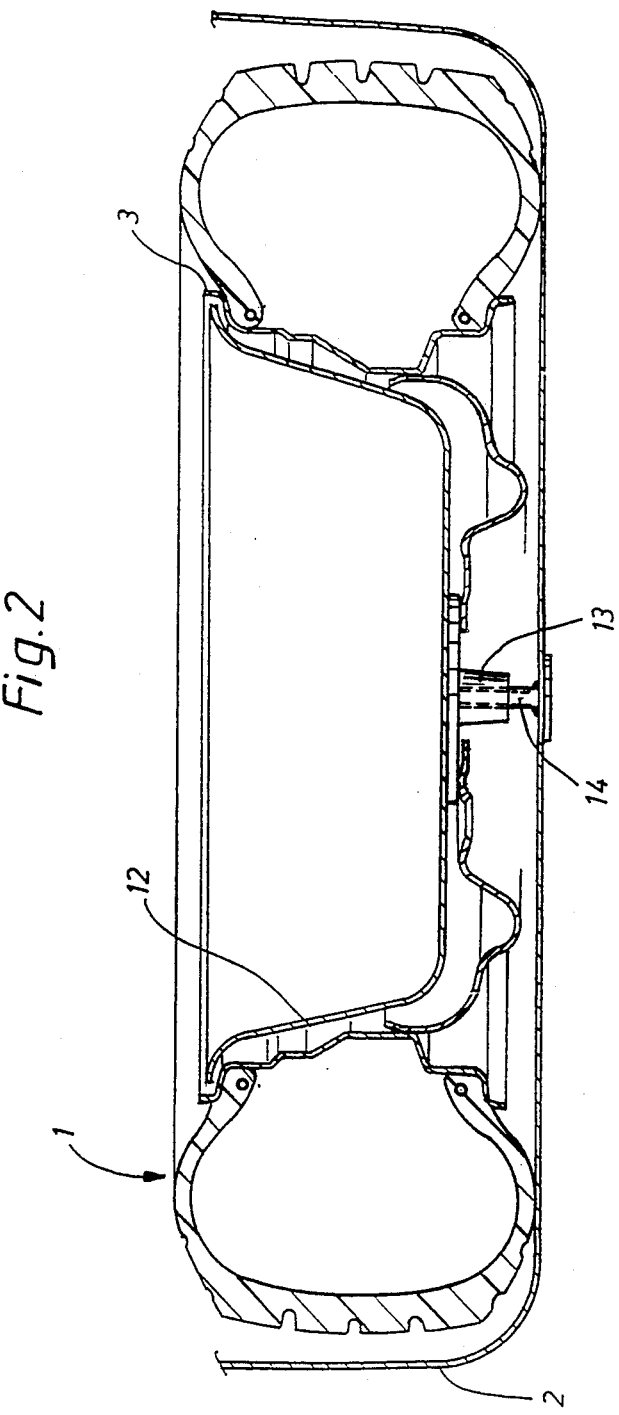

ARRANGEMENT OF A SPARE WHEEL IN A MOTOR VEHICLE

BACKGROUND AND SUMMARY OF THE INVENTION

The invention relates to a means for locking a spare or mounted wheel having a reverse wheel rim. More particularly, the invention relates to a means for simultaneously securing a pot-shaped container within a cavity of the reverse wheel rim and securing the spare wheel within a trough provided in a motor vehicle.

An arrangement wherein a pot-shaped container is inserted into the cavity of a wheel rim of a spare wheel in a motor vehicle is already known from German Utility Model Specification No. 78 20,026. The container described therein can be fastened by magnets to the spare wheel rim while no provision is made for the fastening of the wheel itself.

It is therefore an object of the present invention to secure both the container and the spare wheel in position within a motor vehicle in a simple manner.

According to the present invention the mounting problem is solved by attaching a fastening member to the motor vehicle and positioning a fastening means on a bottom wall of the container to secure the spare wheel in a position within the motor vehicle.

Further objects, features, and advantages of the present invention will become more apparent from the following description when taken with the accompanying drawings which show, for purposes of illustration only, embodiments in accordance with the present invention.

BRIEF DESCRIPTION OF THE DRAWINGS

FIG. 1 is a cross-sectional view of a motor vehicle trough housing a spare wheel and a container showing a first embodiment of the invention; and FIG. 2 is a cross-sectional view of a motor vehicle trough housing a spare wheel and a container showing a second embodiment of the invention.

DETAILED DESCRIPTION OF THE DRAWINGS

The drawing shows a vertical section of a spare wheel 1 which is accommodated in a trough 2 fastened to the vehicle. A pot-shaped container 4 is disposed inside the rim 3 of the spare wheel 1. The container 4 can be used to hold objects of any kind, such as tools or other small articles.

A clamp bow or latch 6 is fastened on the lower face of the bottom of the container 4 to swivel about a pin 5. The clamp bow 6 is provided with a nose which cooperates with an aperture in a catch element or fastening member 7 fastened to the bottom of the trough 2 to fasten the container 4 in position.

The spare wheel 1 and the container 4 are fastened in the following manner:

The container 4 is inserted into the rim 3 and pressed down compressing an intermediate elastomer layer 8. A guide rail 9 projects from the lower face of the container bottom to facilitate insertion of the container 4 in the correct position. The nose of the clamp bow 6 is spring-loaded by an elastomer block 10 and slides along the catch member 7 until it automatically engages in the aperture in the member 7.

Unlocking is effected by applying pressure to the button 11 of the clamp bow 6.

In the embodiment of the invention shown in FIG. 2 of the drawing, a container 12 is inserted in the rim 3 of the spare wheel 1. The container 12 is preferably made of plastics material and carries a nut 13 on the lower face of its bottom. The nut 13 together with a threaded bolt 14 fastened to the vehicle form the fastening device for the spare wheel 1. This embodiment has the particular advantage that the contents of the container 12 can remain in the latter when the spare wheel is detached and removed or when it is secured in position, because no button or the like in the bottom region has to be operated.

Although the invention has been described in detail with reference to certain preferred embodiments and specific examples, variations and modifications exist within the scope and spirit of the invention as described and defined in the following claims.

What is claimed is:

1. In a motor vehicle having a horizontally mounted spare wheel, the spare wheel including a wheel rim formed to provide a container-receiving cavity, and a pot-shaped container inserted in the cavity, the improvement comprising
    a fastening member attached to the motor vehicle, and
    a fastening means disposed on a bottom wall of the container and operable from above the horizontally mounted spare wheel for engaging the fastening member to secure the container to the vehicle,
    wherein an outer surface of the container is pressed against the spare wheel to secure the spare wheel in a position in the vehicle, and wherein the container fills a substantial portion of the cavity of the wheel rim.

2. The improvement of claim 1, wherein the fastening member is a threaded bolt and the fastening means includes a bolt-receiving nut.

3. The improvement of claim 1, wherein the fastening means includes a latch and the fastening member is formed to include a latch-receiving aperture.

4. The improvement of claim 3, wherein the latch is spring-biased by an elastomeric element which contacts a movable element of the latch.

5. The improvement of claim 3, wherein the latch includes a button which extends through the bottom wall of the container to facilitate disengagement of the latch from the aperture.

6. The improvement of claim 1, wherein an elastomeric layer is provided on the bottom wall of the container, and wherein the elastomeric layer is pressed against the spare wheel to secure it in said position in the vehicle.

7. The improvement of claim 1, wherein a guide rail is provided on the bottom wall of the container to facilitate engagement of the fastening member and fastening means.

* * * * *